United States Patent [19]
Hamada

[11] Patent Number: 5,923,463
[45] Date of Patent: Jul. 13, 1999

[54] OPTICAL AMPLIFIER AND METHOD FOR CONTROLLING THE SAME

[75] Inventor: Satoshi Hamada, Tokyo, Japan

[73] Assignee: NEC Corporation, Tokyo, Japan

[21] Appl. No.: 08/939,877

[22] Filed: Sep. 29, 1997

[30] Foreign Application Priority Data

Oct. 2, 1996 [JP] Japan ................................. 8-261085

[51] Int. Cl.⁶ ............................... H01S 3/10; G02B 6/00
[52] U.S. Cl. ........................................ 359/341; 359/337
[58] Field of Search ................................ 359/341, 337, 359/345

[56] References Cited

U.S. PATENT DOCUMENTS

| 5,291,326 | 3/1994 | Heidemann | 359/160 |
| 5,589,975 | 12/1996 | Nakamura et al. | 359/345 |
| 5,625,481 | 4/1997 | Tamura | 359/179 |

FOREIGN PATENT DOCUMENTS

| 5-226747 | 9/1993 | Japan . |
| 6-152034 | 5/1994 | Japan . |
| 6-216452 | 8/1994 | Japan . |

*Primary Examiner*—Nelson Moskowitz
*Attorney, Agent, or Firm*—Whitham, Curtis & Whitham

[57] ABSTRACT

A wavelength within an amplifying wavelength band of an optical amplifier is introduced into the optical amplifier at all times or when an interruption and/or reduction of a ray of input light is detected. When the interruption and/or reduction of the input light is detected, an output of the excited light is interrupted or reduced, an optical switch is controlled so that the input light is interrupted, and after the input light is restored, a transmittivity of the optical switch is progressively increased or the input light is passed for a constant period of protection time. Thus, when the input light has been restored, a light surge may be reduced without any adverse affect of a reverse distribution of the optical amplifier. In the case where the input light is abruptly raised during a period of moderation of the excited level, it is possible to suppress the light surge caused by the long service life due to the natural discharge of the excited level.

9 Claims, 12 Drawing Sheets

OPTICAL AMPLIFIER AND METHOD FOR CONTROLLING THE SAME

BACKGROUND OF THE INVENTION

1. Field of the Invention

The present invention relates to an optical amplifier and a method for controlling the optical amplifier, and more particularly to an optical amplifier provided with a function of suppressing a light surge caused by a light interruption in an optical relay transmission system or the like, and also a method for controlling the latter optical amplifier.

2. Description of the Related Art

There are some cases in an optical amplifier where a light surge occurs if signal light to be inputted is interrupted. In the conventional optical amplifier, in order to suppress the light surge caused by the interruption of the input light, a part of the input light is branched off by an optical splitter so that a part of the output light is detected by an output light monitor. The condition of the output light is supervised, and a pumping light source driver circuit is controlled by an output controller in the case where the interruption of the input light is detected. The output of the pumping light source is thus controlled.

A part of the input light is branched off by the splitter and detected by the input light monitor. The input photoelectric power level is compared with a predetermined photoelectric level at the input light reduction detector. When the input photoelectric power level is less than the predetermined photoelectric power level, the input light reduction detector feeds a signal to the output controller. A control target of the output constant control is lowered in accordance with this signal to thereby change the operational mode to the output reduction condition. By these operations, it is possible to suppress the light surge even if the input is abruptly raised because the optical amplifier is brought into a low gain condition when the input light is less than the predetermined photoelectric power level.

With such an arrangement, it is possible to suppress the light surge in the case where the input light is abruptly raised a sufficient time after the input photoelectric power has been lowered for changing the mode to the output reduction condition when the input photoelectric power is less than the predetermined photoelectric power level.

However, with the above-described arrangement and method, in the case where the input light is abruptly raised in a short period of time in the range of about several milliseconds to several tens of milliseconds or less after the input photoelectric power has been lowered, there is a problem that the optical amplifier has a gain and the light surge occurs. Accordingly, it is impossible to completely suppress the light surge in accordance with a condition of the signal light to be inputted.

SUMMARY OF THE INVENTION

Object of the Invention

An object of the invention is to provide an optically amplifying apparatus for suppressing a light surge against such a high rate interruption that an input photoelectric power is raised in a period of several tens of milliseconds after the input photoelectric power has been lowered.

Summary of the Invention

An optically amplifying apparatus according to the present invention, has an optical amplifier, a pumping light source, a wavelength division multiplexer (WDM) to feed a pumping light to the optical amplifier, and light output stabilizer to stop and/or reducing an output of the pumping light source when a reduction and/or interruption is detected. The apparatus also includes an auxiliary light source, and an optical coupler to introduce a light fed out of the auxiliary light source to the optical amplifier.

Another optically amplifying apparatus according to the present invention comprises an optical coupler to introduce the light fed out of the auxiliary light source to the optical amplifier when the reduction and/or interruption of the input light is detected.

Another optically amplifying apparatus according to the present invention comprises an optical switch disposed on an input side of the optical amplifier, and an optical switch control circuit. The optical switch control circuit controls the optical switch so that the input light is interrupted when it is detected that the input light is reduced or interrupted. When the input light has been restored, the transmittivity of the optical switch is progressively increased. When the reduction and/or interruption of the input light is detected, the optical switch is controlled so that the input light is interrupted. After the input light has been restored, this condition is kept for a constant period of protection time, and thereafter, the input light is passed. Alternatively, the optical switch is controlled so that the input light is interrupted when the reduction and/or interruption of the input light is detected. After the input light has been restored, this condition is kept on for a predetermined protection time period. Thereafter, the transmittivity of the light switch is progressively increased.

According to the present invention, in a method for controlling the optically amplifying apparatus, normally a wavelength within an amplified wavelength band of the optical amplifier is fed to the optical amplifier, and the output of the pumping light source is stopped or reduced when a reduction or interruption of the signal light is detected. When it is detected that the input light is reduced or interrupted, the output of the pumping light is stopped or reduced, thereby introducing the pumping light to an optical amplifier with the wavelength within the amplified wavelength band of the optical amplifier.

In another method for controlling the optically amplifying apparatus according to the present invention, when the reduction and/or interruption of the input light is detected, the output of the pumping light is stopped or reduced, and the optical switch is controlled so that the input light is interrupted. After the input light has been restored, the optical switch is controlled to transmit the input light.

In the structure of the first optically amplifying apparatus according to the present invention, the output of the auxiliary light source is normally inputted into the optical amplifier. For this reason, the service life of the inductive discharge is moderated which is considerably shorter than the service life of the natural discharge in the excited level of the optical amplifier under the condition that the excited photoelectric power is lowered or stopped. Thus, even if the reverse distribution is obviated immediately and the input light has been raised abruptly within a period of several tens of milliseconds or less after the input photoelectric power has been lowered, it is possible to suppress the light surge.

In a structure of a second optically amplifying apparatus according to the present invention, when the input photoelectric power has been reduced or stopped, the pumping light source has been stopped or operated in a low output operation, and at the same time, the auxiliary light source is emitted so that its light is introduced into the amplifier. Thus, under the condition that the excited photoelectric power is reduced or stopped, the excited level of the optical amplifier is moderated in a service life of the inductive discharge that is much shorter than the service life of the natural discharge. For this reason, the reverse distribution is obviated immediately. Even if the input light has been abruptly raised in a period of the several tens of millisecond or less after the input photoelectric power has been lowered, it is possible to suppress the light surge. In this structure, since the auxiliary light source is stopped in the normal operation condition of the optical amplifier in comparison with the above-described structure, it is possible to enhance reliability and reduction of the consumed electric power.

In another structure of the invention, the pumping light source is interrupted or operated in the output reduction operation when the input photoelectric power is lowered or interrupted, and at the same time, the optical switch is set in the off condition immediately. Thus, even if the input light is abruptly raised in a period less than several tens of milliseconds after the input photoelectric power has been lowered, the optical switch is turned off so that the input light is not introduced into the optical amplifier, thereby being capable of suppressing the light surge.

In a structure using the optical switch, if a structure is taken in which the transmittivity of the optical switch is progressively increased after the input light has been raised, there is no fear that the input light having an abrupt rise would be introduced into the optical amplifier. Accordingly, it is possible to suppress the light surge and to bring the condition back to the normal operational condition.

Even if the input light is raised, a constant period of time until the excited condition is moderated is set as the protection period of time. After the exited condition has been moderated, if the optical switch is turned on, it is possible to suppress the light surge and restore the condition back to the normal operational condition for the interruption at such a high rate that the photoelectric power has been raised for a period less than several tens of milliseconds after the input photoelectric power has been lowered.

After the input light has been raised, if the transmittivity of the optical switch is progressively increased after an elapse of the protection period of time, there is no fear that the input light having an abrupt rise would be introduced into the optical amplifier. Accordingly, it is possible to suppress the light surge more completely and to restore the condition back to the normal operational condition.

BRIEF DESCRIPTION OF THE DRAWINGS

The above and other objects, features and advantages of the present invention will become more apparent from the following detailed description when taken in conjunction with the accompanying drawings wherein:

FIG. 3 is a view showing a relationship of an input and output in the conventional structure in the case where an interruption is presented in the input light with (a) showing a waveform of the input signal light and (b) showing a waveform of the amplified light output;

FIG. 5 is a view showing a relationship of an input and output in the structure according to the present invention in the case where an interruption is presented in the input light with (a) showing a waveform of the input signal light and (b) showing a waveform of the amplified light output;

FIG. 7 is a view showing a relationship of an input and output in the structure according to the present invention in the case where an interruption is presented in the input light with (a) showing a waveform of the input signal light and (b) showing a waveform of the amplified light output;

FIG. 9 is a view showing a relationship of an input and output in the structure according to the present invention in the case where an interruption is presented in the input light with (a) and (b) showing a waveform of the input signal light and (c) showing a waveform of the amplified light output;

FIG. 11 is a view showing a relationship of an input and output in the structure according to the present invention in the case where an interruption is presented in the input light with (a) and (b) showing a waveform of the input signal light and (c) showing a waveform of the amplified light output;

FIG. 13 is a view showing a relationship of an input and output in the structure according to the present invention in the case where an interruption is presented in the input light with (a) and (b) showing a waveform of the input signal light and (c) showing a waveform of the amplified light output.

DETAILED DESCRIPTION OF THE PREFERRED EMBODIMENTS

In order to clarify the causes of the generation of the light surge under certain conditions, a structure of the conventional optical amplifier and a mechanism of generating the light surge will first be described before explaining the optical amplifier according to the present invention.

Figure 1:
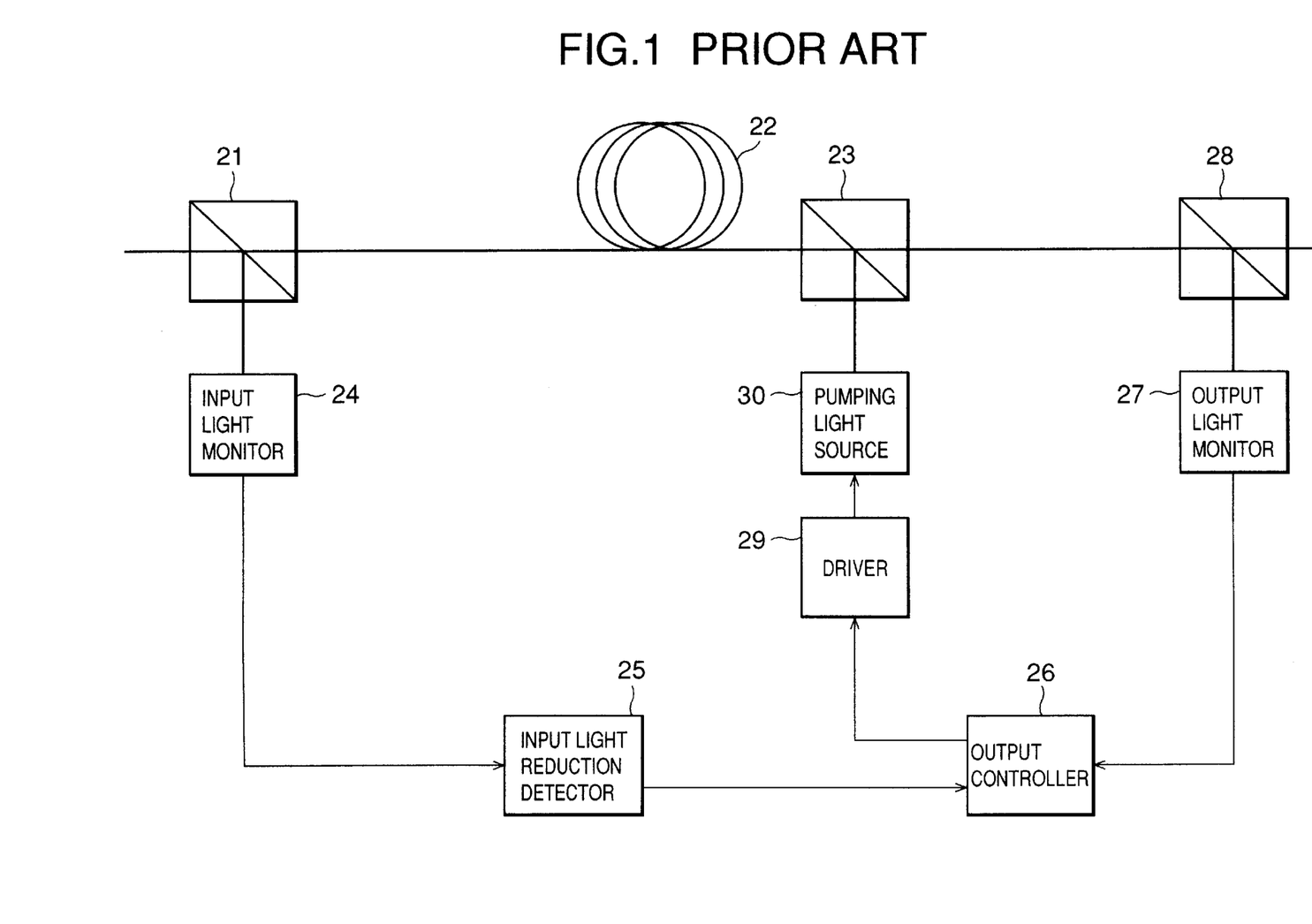
FIG. 1 is a block diagram showing an example of a conventional optical amplifier.

FIG. 1 shows a structure of the conventional optical amplifier. In the conventional optical amplifier, a part of an output ray of light is branched at an optical splitter 28 (optical coupler) and is detected by an output monitor 27. In accordance with a condition of the input light detected by the output light monitor 27, an output controller 26 controls a pumping light source driver 29 to thereby control an output of the pumping light source 30.

On the other hand, a part of the input light is branched off at an optical splitter 21 and is detected by an input light motor 24. The input photoelectric power level is compared with a predetermined photoelectric power level in an input light reduction detector 25. In this case, when the input photoelectric power is less than a predetermined photoelectric power level, the input light reduction detector 25 sends a signal to the output controller 26. In accordance with this signal, the control target of the output constant control is lowered to change the mode to the output reduction condition. It is possible to suppress the light surge even if the input light is abruptly raised because the optical amplifier is brought into a low gain condition when the input photoelectric power is less than the predetermined photoelectric power level.

With such an arrangement shown in FIG. 1, it is possible to suppress the light surge in the case where the input light is abruptly raised a sufficient time after the input photoelectric power has been lowered for changing the mode to the output reduction condition when the input photoelectric power is less than the predetermined photoelectric power level.

Figure 2:
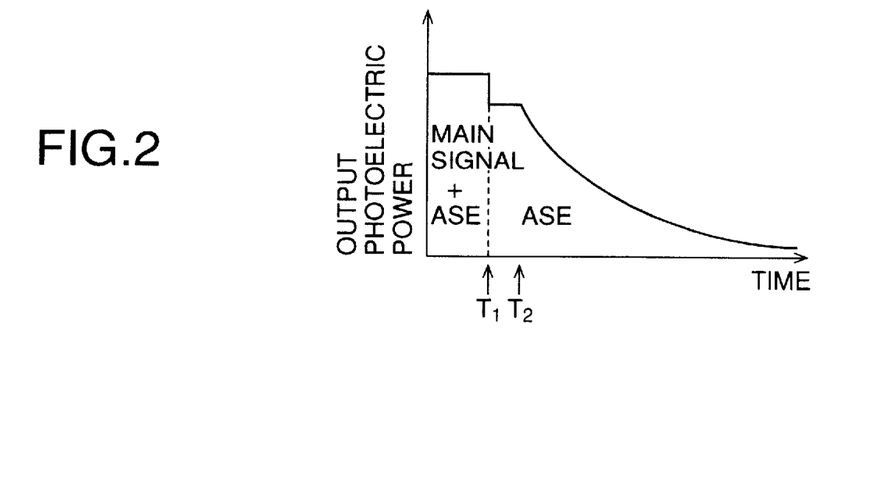
FIG. 2 is a view showing an attenuated process of a ray of natural discharge light after an exciting light source has been stopped.

However, even if the pumping light source is reduced or stopped, the optical amplifier has a long service life in the range of several milliseconds to several tens of milliseconds due to a natural discharge at an excited level. Accordingly, a reversal distribution is kept for a period until the excited level is moderated so that the amplifier has a potential energy. A n attenuation process of a natural discharge light (Amplified Spontaneous Emission: ASE) after the pumping light source is stopped is schematically shown in FIG. 2 as an example representative of the state of the moderation of the excited level. In FIG. 2, after the input light has been lowered or interrupted at time $T_1$, a predetermined output exists for a period of the effective excited light. The ASE is progressively reduced after the interruption of the excited light (time $T_2$).

Figure 3:
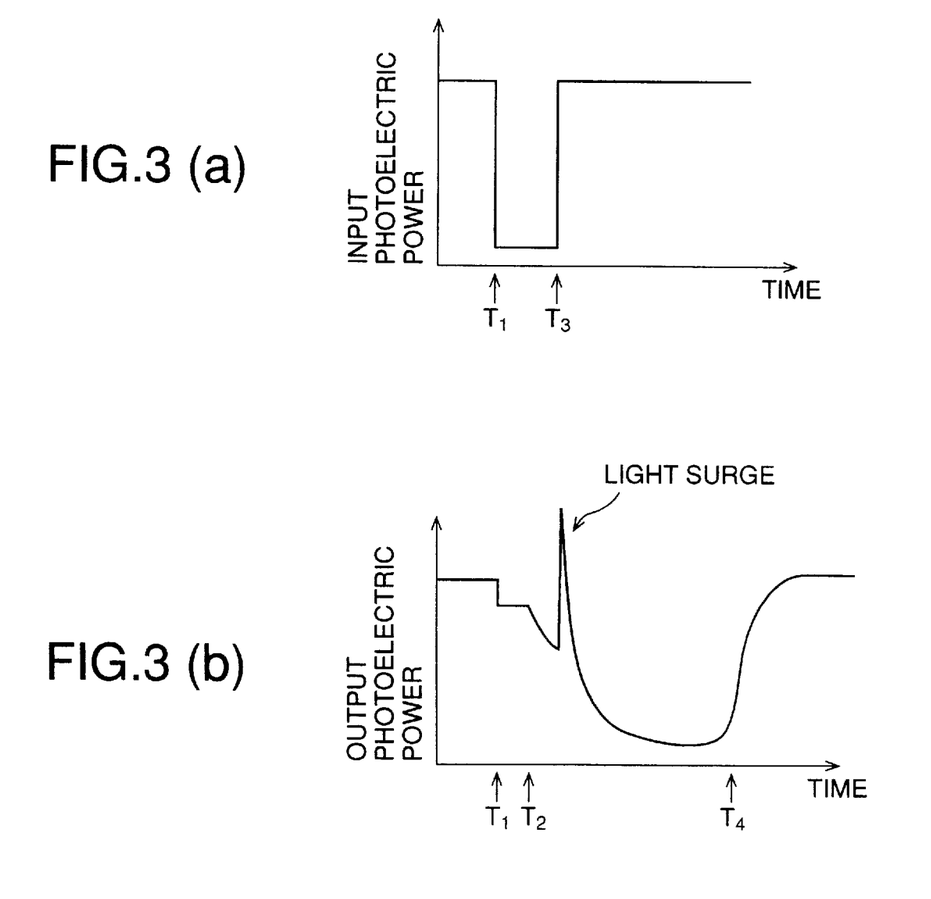

For this reason, in the case where the input light is abruptly raised in a short period of time in the range of about several milliseconds to several tens of milliseconds or less, there is a problem that the optical amplifier has a gain and the light surge occurs, after the input photoelectric power has been lowered. FIGS. 3(a) and 3(b) schematically show a relationship of the input and output in the case where the input light is abruptly raised in a short period of time in the range of about several milliseconds to several tens of milliseconds or less, after the input photoelectric power has been lowered. In the process in which the ASE is attenuated, when the input light is raised (time $T_3$) the light surge occurs. Thereafter, when the excited light is restored (time $T_4$), the output photoelectric power is restored to the original level.

An embodiment of an optical amplifying apparatus according to the present invention will now be described.

Figure 4:
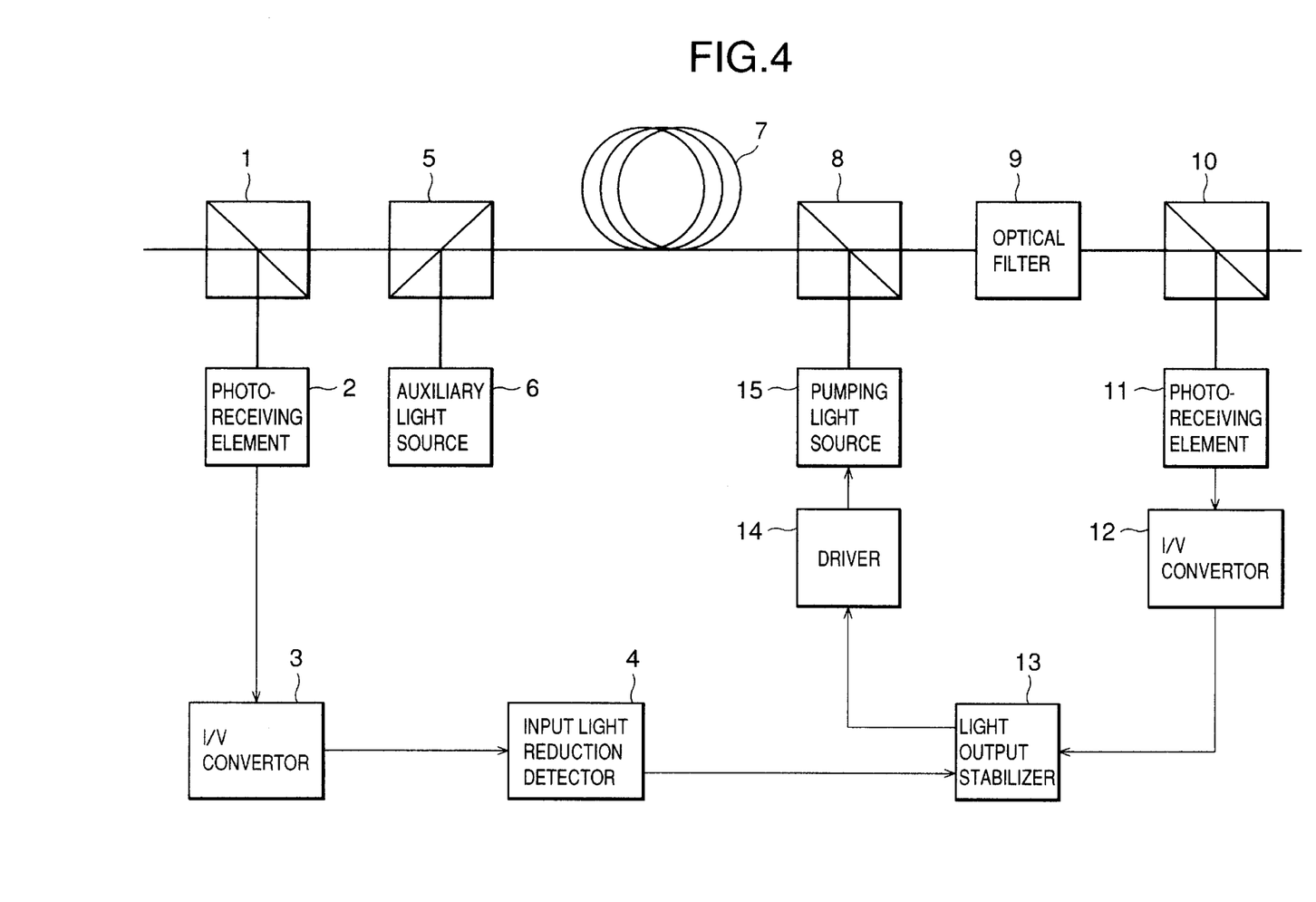
FIG. 4 is a block diagram showing a structure of an optical amplifier according to a first embodiment of the invention.

FIG. 4 is a block diagram showing an optical amplifier for suppressing the light surge according to a first embodiment of the present invention. On the input side, there are provided an optical splitter 1 to branch a part of the input light, a photoreceiving element 2 for receiving and photoelectrically converting the part of the branched input light, and an I/V convertor 3 to convert a current from the photoreceiving element 2 to a voltage. Connected to the optical amplifier for directly optically amplifying the input light are an pumping light source 15 to introduce the pumping light to the optical amplifier 7, a WDM 8 to feed the pumping light from the pumping light source 15 to the optical amplifier 7 and to introduce the amplified signal light to the output portion, and an pumping light source driver 14 to drive the pumping light source.

On the output side, there are provided an optical splitter 10 to branch a part of the light, a photoreceiving element 11 to receive and photoelectrically converting the part of the branched output light, an I/V convertor 12 to convert a current from the photoreceiving element 11 to a voltage, and a light output stabilizer circuit 13 to control pumping light source driver 14 so that the output of the optical amplifier is kept constant in accordance with a signal from the I/V convertor 12.

An input light reduction detector 4 to compare the signal from the I/V convertor 3 with a reference level to thereby detect that the input photoelectric power has been lowered or interrupted has a function of stopping the pumping light source 15 or reducing the output of the pumping light source 15 when the input light is lowered or interrupted.

Furthermore, the optical amplifying apparatus includes an auxiliary light source 6 to feed a light having a wavelength that is different from a wavelength of the main signal light within the amplified wavelength band of the optical amplifier 7, an optical coupler 5 to couple the light from the auxiliary light source 6 with the input light into the optical amplifier 7, and an optical filter 9 for passing a wavelength component of the input light out of the output light of the optical amplifier 7 and removing a wavelength component of the auxiliary light source 6. The light from the auxiliary light source 6 is normally emitted and inputted into the optical amplifier 7.

In the case where the input photoelectric power is lowered or interrupted, the optical amplifying apparatus detects the reduction of the input light, and immediately stops the pumping light source 15 or operates the latter in the output reduction operation. In this case, since the input light from the auxiliary light source 6 exists in the optical amplifier 7, the excited condition is moderated at a high rate by the inductive discharge.

Figure 5:
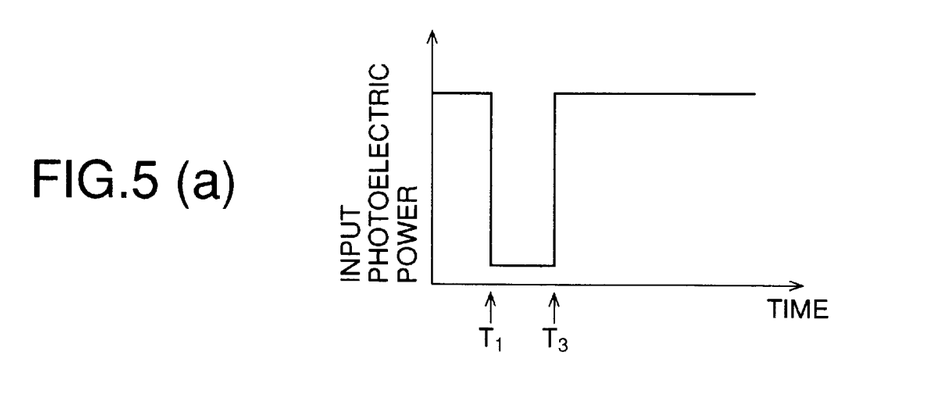

FIGS. 5(a) and 5(b) show a relationship of the input light and the output light of the optically amplifying apparatus in the case where the input light has a high rate interruption. Since the auxiliary light source is normally emitted, at the moment when the input light is interrupted, the output photoelectric power is reduced immediately. Thereafter, the pumping light is stopped and the light surge is very small. As shown in FIGS. 5(a) and 5(b), the optical amplifier operates as an attenuator even for the high rate interruption to thereby suppress the light surge.

Figure 6:
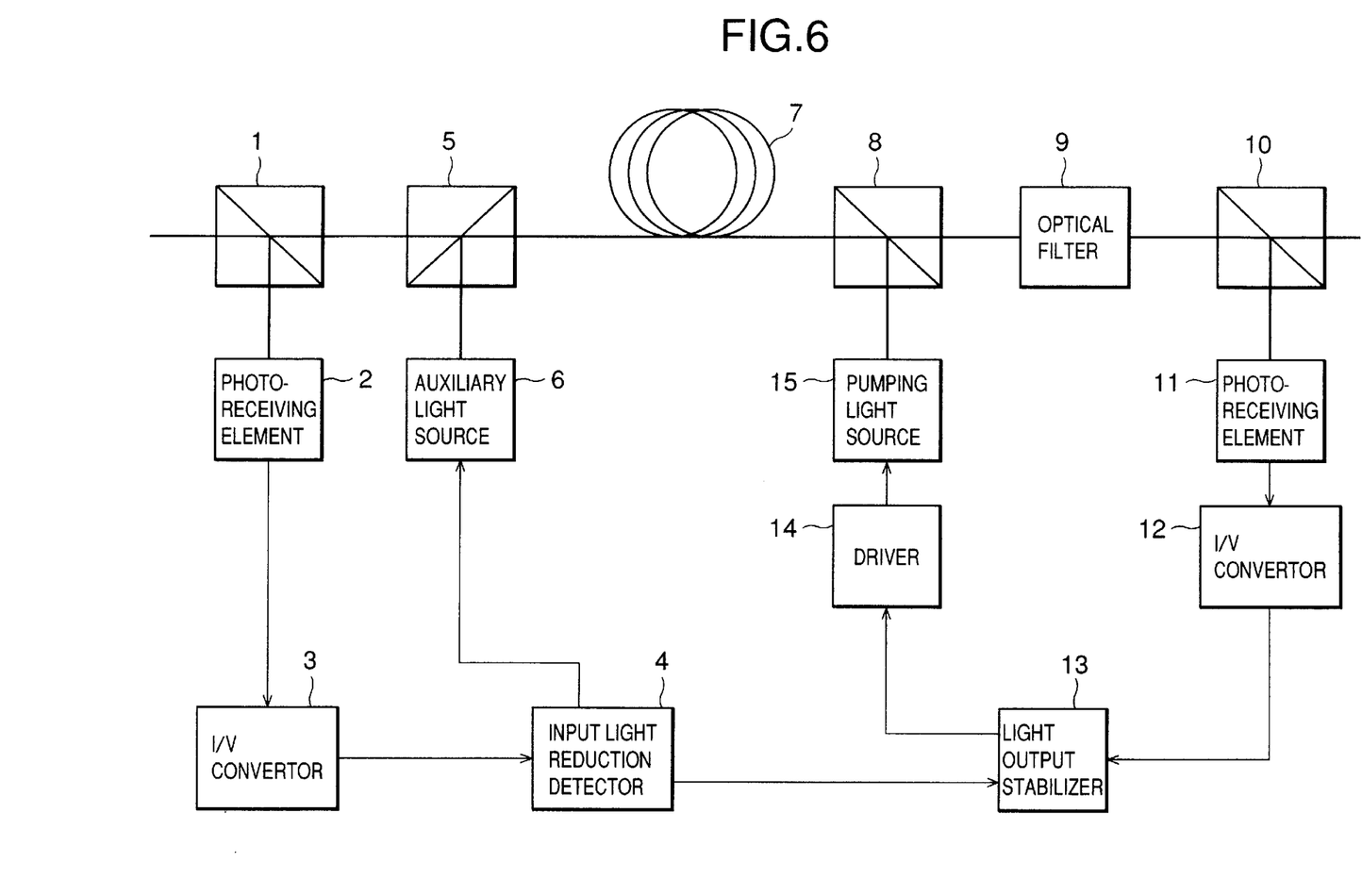
FIG. 6 is a block diagram showing a structure of an optical amplifier according to a second embodiment of the invention.

FIG. 6 is a block diagram showing an optically amplifying apparatus for suppressing the light surge according to a second embodiment of the present invention. The basic structure is the same as that shown in FIG. 4. In this embodiment, the pumping light source 15 is stopped after the input light reduction detector 4 detects that the reduction or interruption of the input light, and at the same time, the above-described auxiliary light source 6 is lit or operated.

In case of the reduction or interruption of the input photoelectric power, the optically amplifying apparatus detects the input light reduction, and immediately lights or operates the auxiliary light source, simultaneously with the stop or the output reduction operation of the pumping light source 15. At this time, since the input light from the auxiliary light source 6 exists in the optical amplifier 7, the excited condition is moderated at a high rate by the inductive discharge.

Figure 7:
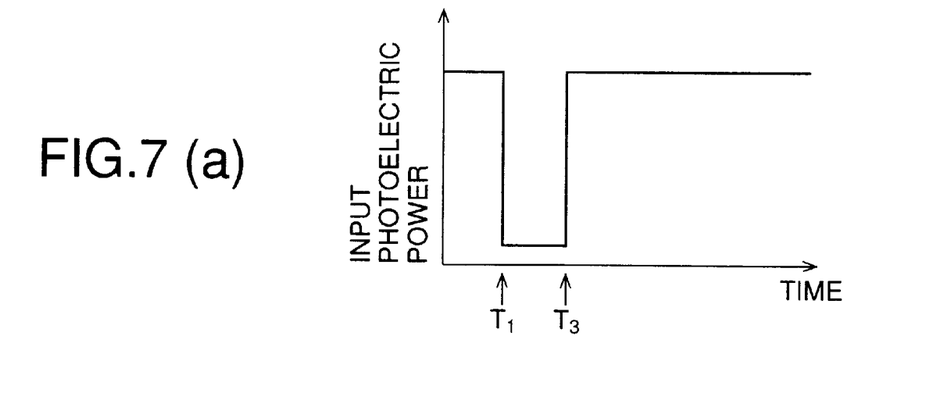

FIGS. 7(a) and 7(b) show a relationship of the input light and the output light of the light amplifying apparatus in the case where the input light has a high rate interruption. In this case, after the input light has been interrupted, the output is kept constant until the pumping light is stopped. If the light of the auxiliary light source is fed ($T_5$), the light output is abruptly reduced. As shown in FIGS. 7(a) and 7(b), the optical amplifier operates as an attenuator even for the high rate interruption to thereby suppress the light surge. The light surge that occurs at the rise of the auxiliary light source 6 is removed by the optical filter 9.

In the structure of the foregoing example, the light fed out of the auxiliary light source 6 is introduced from the input side of the signal light to the optical amplifier 7. It is however possible to introduce it from the output side of the signal light to the optical amplifier 7. In this case, it is not necessarily required to use the optical filter 9. Also, the wavelength of the auxiliary light source may be the same as that of the signal light. Also, it is possible to control the introduction of the light to the optical amplifier 7 with an optical switch while normally emitting the light from the auxiliary light source 6 in the structure shown in FIG. 4.

Figure 8:
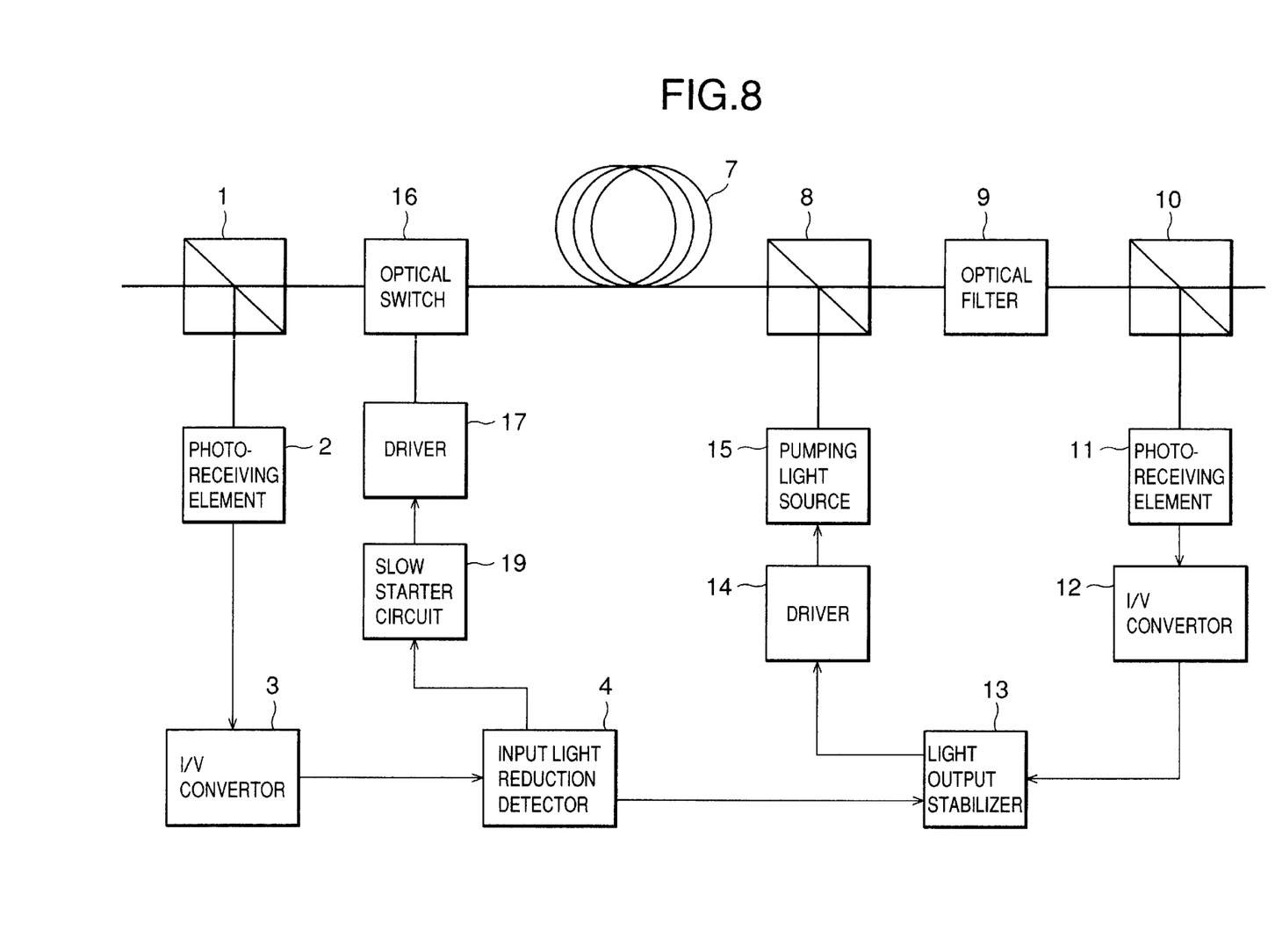
FIG. 8 is a block diagram showing a structure of an optical amplifier according to a third embodiment of the invention.

FIG. 8 is a block diagram showing an optically amplifying apparatus for suppressing the light surge according to a third embodiment of the present invention. In FIG. 8, the optical couple 5 and the auxiliary light source 6 in the structure shown in FIG. 6 are replaced by an optical switch 16 and an optical switch driver 17, respectively. Furthermore, a slow starter circuit 19 is arranged for the optical switch.

The optical switch 16 disposed between the optical splitter 1 and the optical amplifier 7 and used for on/off control of the input light and the optical switch driver 17 to drive the optical switch 16 detect the reduction or interruption of the input light through the input light reduction detector 4. When the pumping light source 15 is stopped, the light switch 16 is brought into an off condition.

At this time, the excited condition of the optical amplifier 7 is moderated for a moderation time of the natural discharge. Even in the case where the input light has a high rate interruption, the input light is not inputted into the optical amplifier 7 since the optical switch 16 is kept in the off condition.

After the input light is restored, the transmittivity is gradually increased by the slow starter circuit 19 for the optical switch 16, and the input photoelectric power of the optical amplifier is gradually increased ($T_6$).

Figure 9:
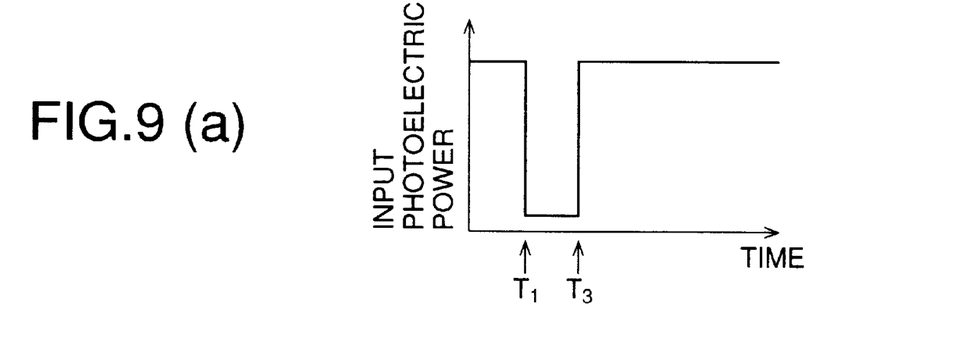

FIGS. 9(a), 9(b) and 9(c) show a relationship of the input light and the input light to the light amplifier 7 and the output light to the optically amplifying apparatus in the case where the input light has a high rate interruption. As shown in FIGS. 9(a), 9(b) and 9(c), since the input light having an abrupt rise has not been introduced into the optical amplifier 7, the light surge is suppressed.

Figure 10:
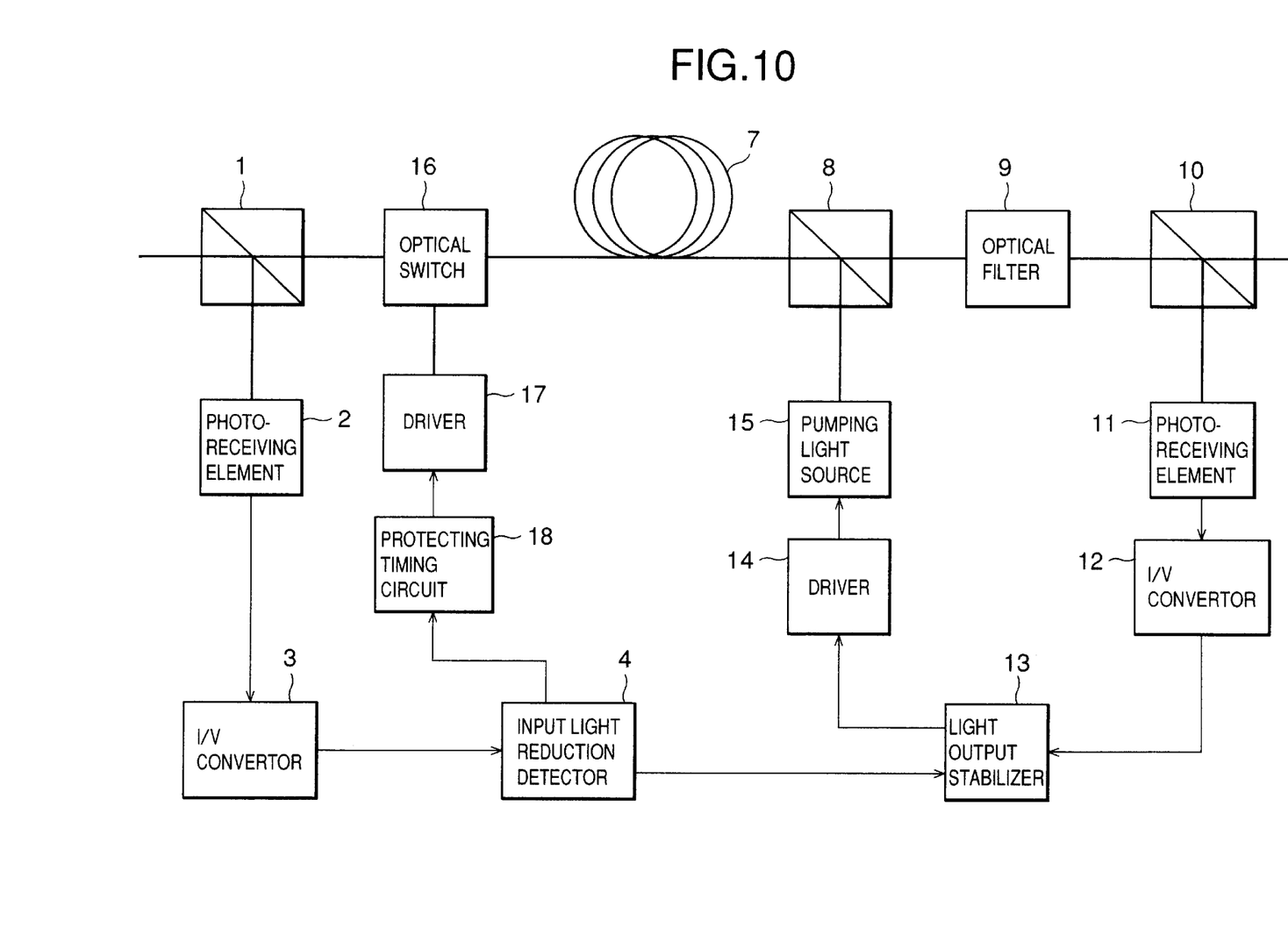
FIG. 10 is a block diagram showing a structure of an optical amplifier according to a fourth embodiment of the invention.

FIG. 10 is a block diagram showing an optical amplifier for suppressing the light surge according to a fourth embodiment of the present invention. In the structure shown in FIG. 10, the optical switch slow starter circuit 19 is replaced by an optical switch protection timing circuit 18.

In the case where the input photoelectric power is lowered or interrupted, the optically amplifying apparatus detects the input light reduction, and immediately brings the optical switch 16 in the off condition, simultaneously with the stop or the output reduction operation of the pumping light source 15. At this time, the excited condition of the optical amplifier 7 is moderated for a moderation time of the natural discharge. However, even if the high rate interruption exists in the input light, since the optical switch 16 is kept in the off condition, the input light is not inputted into the optical amplifier 7.

After the input light is restored, the optical switch 16 keeps the off condition for a protection time period corresponding to the moderation time of the excited condition of the optical amplifier 7 by the optical switch protection timing circuit 18. Thereafter, the input photoelectric power of the optical amplifier 7 is increased ($T_7$).

Figure 11:
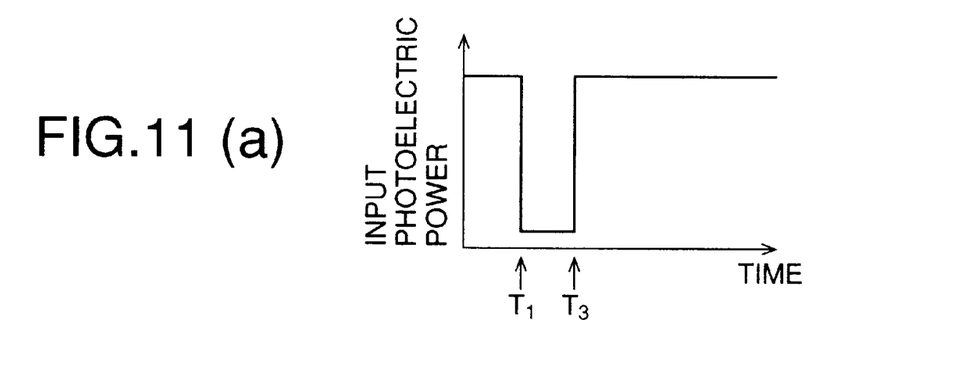

FIGS. 11(a), 11(b) and 11(c) show a relationship of the input light and the input light to the optical amplifier 7 and the output light to the optically amplifying apparatus in the case where the input light has a high rate interruption. As shown in FIGS. 11(a), 11(b) and 11(c), since the optical switch 16 substantially interrupts the input light for a period corresponding to the moderation time of the excited condition of the optical amplifier 7, the optical amplifier 7 operates as an attenuator, and the light surge is suppressed.

Figure 12:
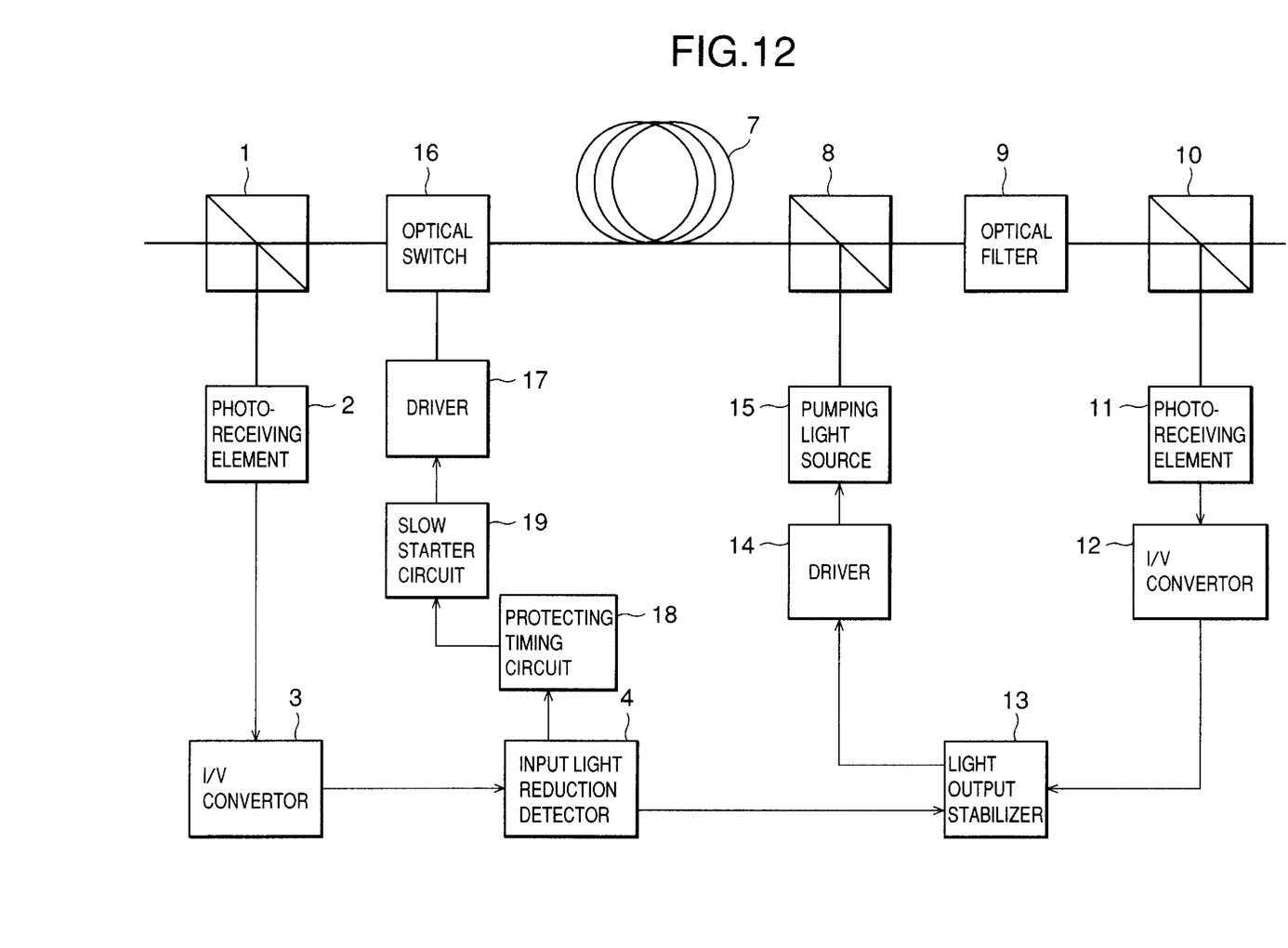
FIG. 12 is a block diagram showing a structure of an optical amplifier according to a fifth embodiment of the invention.

FIG. 12 is a block diagram showing an optical amplifier for suppressing the light surge according to a fifth embodiment of the present invention. In the structure shown in FIG. 12, the optical switch slow starter circuit 19 and the optical switch protection timing circuit 18 are both provided. After the input light is restored, the optical switch 16 keeps the off condition for a protection time period corresponding to the moderation time of the excited condition of the optical amplifier 7. Thereafter, the transmittivity is progressively increased, and the input photoelectric power of the optical amplifier 7 is progressively increased ($T_8$).

Figure 13:
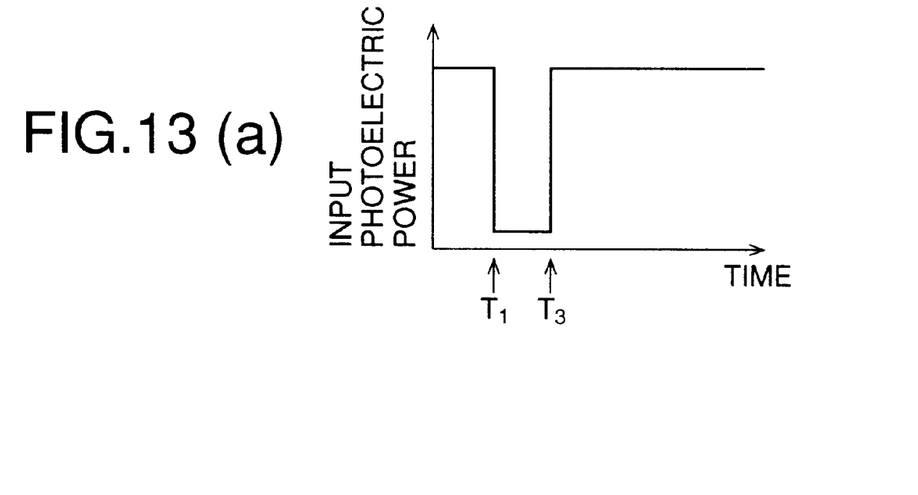

FIGS. 13(a), 13(b) and 13(c) show a relationship of the input light and the input light to the optical amplifier 7 and the output light of the optically amplifying apparatus in the case where the input light has a high rate interruption. As shown in FIGS. 13(a), 13(b) and 13(c), since the input light having an abrupt rise has not been introduced into the optical amplifier 7 and the optical switch 16 has interrupted the input light for a predetermined period of time for the high rate interruption, the optical amplifier 7 serves as an attenuator and the light surge is suppressed.

As described above, according to the present invention, when the input light is interrupted, it is possible to effectively suppress the light surge.

In the foregoing embodiments, the signal light wavelength was 1.55 $\mu$m, the photoreceiving element was a photodiode, the optical amplifier was an erbium doped fiber amplifier, the auxiliary light source was a semiconductor laser device having a wavelength in a 1.5 $\mu$m band, and the pumping light source was a semiconductor laser device having a wavelength of 1.48 $\mu$m.

It is possible to use, as the optical switch, an electric field absorption type semiconductor switch, a magneto-optical switch or any other well known optical switch.

It is possible to use any well known device as the optical splitters, the optical filters and the wavelength divided multiplex splitters. The slow starter circuit is used to change the current value or the voltage value applied to the optical switch and the protection timing circuit is provided with a timer.

Incidentally, it is possible to use the wavelength for the auxiliary light source in the range of 1.52 to 1.58 $\mu$m. Also, one to which a rare earth element other than erbium is doped may be used as the optical amplifier 7.

It is one of the main advantages of the present invention that it is possible to suppress the light surge that occurs in the output of the optical amplifying apparatus even if the input light of the optical amplifying apparatus is abruptly restored in several milliseconds after the input light has been reduced or interrupted. This is because, although the reduction or interruption of the input light is detected to thereby bring the excited light in the stop condition or the output reduction condition, at this time the light from the auxiliary light source 6 is introduced into the optical amplifier 7 so that the excited condition is moderated at a high rate by the inductive discharge. Also, the optically amplifying apparatus detects the condition that the input light is reduced or interrupted to bring the excited light into the stop condition or the output reduction condition, and at the same time to bring the optical switch 16 into the off condition immediately. Accordingly, even if the input light is abruptly raised in several milliseconds, the input light is not introduced into the optical amplifier 7.

Since the optical switch progressively increases the transmittivity after the restoration of the input light, the input light having an abrupt rise is not introduced into the optical amplifier 7. Accordingly, no light surge occurs. Since the optical amplifier 7 is brought into the on condition several tens of milliseconds or more after the excited condition has been moderated by the natural discharge, it is possible to suppress the light surge.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optically amplifying apparatus having an optical amplifier, a pumping light source, means for feeding a pumping light to said optical amplifier, and means for stopping or reducing an output of said pumping light source when a disturbance of an input light is detected, said optically amplifying apparatus comprising:

an auxiliary light source;

means for introducing an excitation light fed out of said auxiliary light source to said optical amplifier; and a detector circuit which outputs a control signal to said auxiliary light source when said disturbance of said input light occurs, said control signal causing said auxiliary light source to introduce the excitation light to said optical amplifier through said introducing means.

2. The optically amplifying apparatus according to claim 1, wherein a wavelength of a ray of light fed out of said auxiliary light source is a wavelength within an amplified wavelength band of said optical amplifier.

3. The optically amplifying apparatus according to claim 2, wherein the wavelength of the ray of light fed out of said auxiliary light source is a wavelength different from a main signal wavelength in the amplified wavelength band of said optical amplifier.

4. The optically amplifying apparatus according to claim 3, further comprising:

an optical filter for removing light at the wavelength of the ray of light fed out of said auxiliary light source and for passing light at the main signal wavelength.

5. An optically amplifying apparatus according to claim 1, wherein said detector circuit includes a first circuit for comparing a level of said input light to a predetermined light level, and a second circuit for generating said control signal when an output from said first circuit indicates that the level of said input signal is below said predetermined light level.

6. An optically amplifying apparatus according to claim 1, wherein said disturbance is an interruption of said input light.

7. An optically amplifying apparatus according to claim 1, wherein said disturbance corresponds to a reduction of a level of said input light below a predetermined light level which is not zero.

8. An optically amplifying apparatus according to claim 1, wherein said means includes an optical coupler which couples said excitation light to said optical amplifier.

9. An optically amplifying apparatus according to claim 1, wherein a light surge is substantially suppressed when the excitation light from said auxiliary light source is input into said optical amplifier.

* * * * *